J. M. LÓPEZ.
SHOCK ABSORBER.
APPLICATION FILED NOV. 18, 1916.
1,221,877.
Patented Apr. 10, 1917.
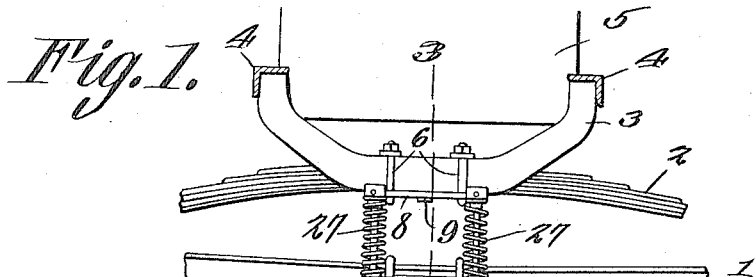
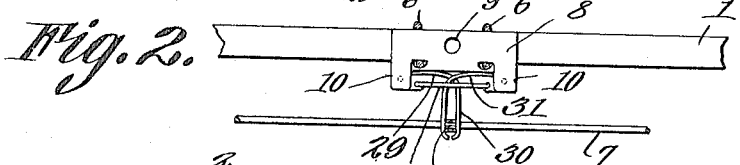
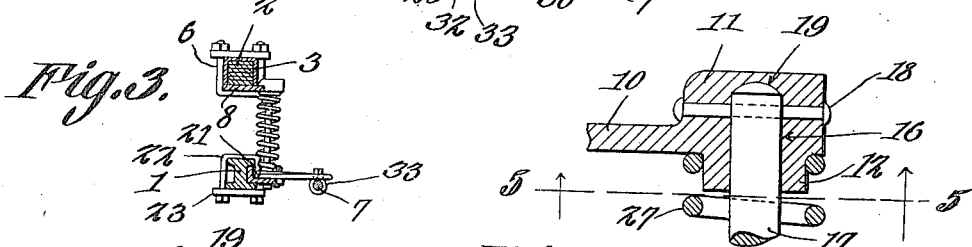
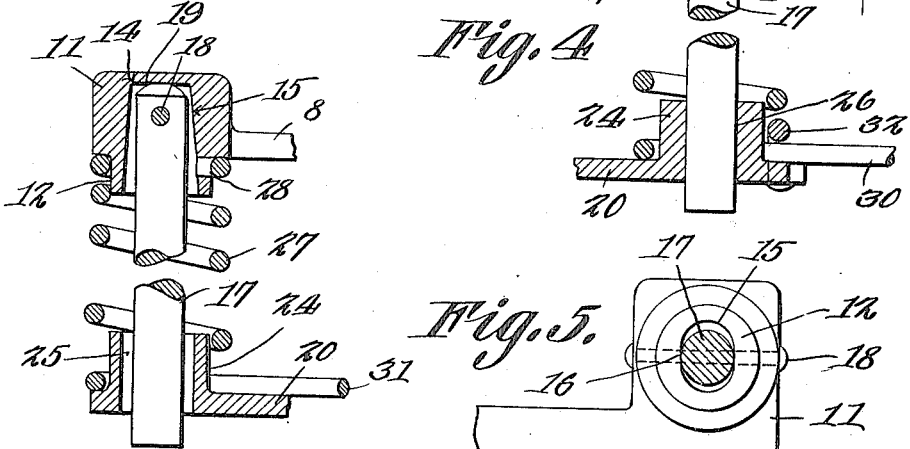
J. M. López,
Inventor,
Witnesses
by
Attorneys.

UNITED STATES PATENT OFFICE.

JESUS M. LÓPEZ, OF C. PIEDRAS NEGRAS COAH, MEXICO.

SHOCK-ABSORBER.

1,221,877.          Specification of Letters Patent.          Patented Apr. 10, 1917.

Application filed November 18, 1916. Serial No. 132,120.

*To all whom it may concern:*

Be it known that I, JESUS M. LÓPEZ, a citizen of the United States, residing at C. Piedras Negras Coah, in the Republic of Mexico, have invented a new and useful Shock-Absorber, of which the following is a specification.

The device forming the subject matter of this application is a shock absorber, and the invention aims to provide novel means whereby the springs of the shock absorber may be made effective for aiding in returning the steering rod to an intermediate position.

Another object of the invention is to provide a shock absorber, which, although affording the necessary vertical movement between the body of the vehicle and the running gear, and permitting a transverse movement between the body and the running gear, will be effective to prevent swinging movement between the body and the running gear fore and aft or longitudinally of the vehicle.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:—

Figure 1 is a transverse section showing a portion of a vehicle frame, the present invention being embodied therewith, and it being presupposed that the observer is looking forwardly toward the front of the vehicle.

Fig. 2 is a top plan looking downwardly on the shock absorber forming the subject matter of this application, the vehicle springs being removed, and the axle and steering rod appearing in top plan;

Fig. 3 is a vertical section taken approximately on the line 3—3 of Fig. 1;

Fig. 4 is a fragmental vertical section taken through a portion of the shock absorber, the cutting plane extending longitudinally of the vehicle;

Fig. 5 is a section on the line 5—5 of Fig. 4; and .

Fig. 6 is a section similar to Fig. 4, the cutting plane, however, passing transversely of the vehicle.

In the drawings, the numeral 1 indicates the front axle of a vehicle, the front springs being shown at 2 and supporting a front brace 3 assembled with the side bars 4 of the chassis. The hood is shown at 5. U-bolts 6 or other connecting elements adapted to a like end, unite the spring 2 with the brace 3. The steering rod of the vehicle is shown at 7 and operates the movable axle ends (not shown). The construction above described is common and well known, and no novelty is claimed therefor, saving in so far as the parts above enumerated may enter into combination with parts hereinafter set forth.

The shock absorber forming the subject matter of this application includes a top plate 8 which abuts against the lower edges of the brace 3 and the spring 2, the top plate 8 being held in place by the U-bolts 6 and by an additional bolt 9, if desired. The top plate 8 has rearwardly projecting arms 10 provided with upstanding bosses 11 having depending necks 12. In the lower faces of the bosses 11 and in the necks 12, recesses 14 are formed. The recesses 14 are elongated transversely of the vehicle, as shown at 15. Longitudinally of the vehicle, the recesses 14 are of a common diameter, as shown at 16.

The upper ends of rods 17 are mounted in the recesses 15 and are held therein by pivot elements 18 engaged with the bosses 11. The upper ends of the rods 17 preferably are rounded as shown at 19, and bear against the bosses 11 at the upper ends of the recesses 14.

The numeral 20 denotes a bottom plate having an upstanding flange 21. The flange 21 is received between the flanges of the axle 1 which, ordinarily, is an I-beam. The bottom plate 20 is held on the axle 1 by means of U-bolts 22 engaged with a clip plate 23 bearing on the lower face of the axle, one arm of each U-bolt 22 passing downwardly to the rear of the flange 21, and through the bottom plate 20, as clearly disclosed in Fig. 3. The bottom plate 20 is provided with upstanding bosses 24 having openings which receive the rods 17. The openings are elongated or enlarged transversely of the vehicle, as shown at 25, but longitudinally of the vehicle, they conform to the diameter of the rods 17, as shown at 26.

Helical compression springs 27 are interposed between the plates 8 and 20 and surround the rods 17. The upper ends of the springs 27 are secured as indicated at 28 to the necks 12 of the plate 8. (Note Fig. 6.) The lower ends of the springs 27 terminate in arms 29 prolonged toward the longitudinal center of the vehicle and crossed upon each other as shown at 31, the arms 29 including rearwardly projecting angular fingers 30 lying on opposite sides of a projection 33 on the steering rod 7. The projection 33 may be in the form of a clamp detachably and adjustably mounted on the steering rod. The fingers 30 of the springs 27 pass under an arched guide 32, the ends of which are connected with the plate 20.

It is obvious that the springs 27, coöperating with the plates 8 and 20, will serve as a shock absorber. The rods 17 can move vertically in the openings in the bottom plate 20, and the lower ends of the rods can swing, transversely of the vehicle, in said openings. The upper ends of the rods 17, in a similar manner, can swing on the pivot elements 18, transversely of the vehicle, in the recesses 14. The construction, however, is such that the rods 17 cannot swing longitudinally of the vehicle. The body portion of the vehicle, therefore, can have the necessary lateral movement, but the rods 17, coacting with the plates 8 and 20, limit and prevent relative movement between the body and the running gear, longitudinally of the vehicle. When the steering rod 7 is moved endwise, the projection 33 on the steering rod engages the fingers 30, and the fingers 30 react on the springs 27. The springs 27 and the fingers 30, therefore, constitute an important assisting means, for aiding in returning the steering rod 7 to a neutral or intermediate position, that is, into the position which the steering rod will assume, when the wheels of the vehicle are set for a straight course.

Having thus described the invention, what is claimed is:—

1. The combination with the running gear, the body and the steering rod of a vehicle, of a spring interposed between the body and the running gear and constituting a shock absorber, the spring having an elongation; and means carried by the steering rod for engaging the elongation of the spring positively whereby the spring will constitute a returning means for the rod.

2. The combination with the running gear, the body and the steering rod of a vehicle, of a helical spring interposed between the body and the running gear and constituting a shock absorber, the spring having an elongation; and means carried by the steering rod for engaging the elongation of the spring positively whereby the spring will constitute a returning means for the rod.

3. The combination with the running gear, the body and the steering member of a vehicle, of a helical spring interposed between the body and the running gear and constituting a shock absorber, the spring having an elongation; a rod extended through the spring; and means for connecting the rod with the running gear and the body, to permit a swinging movement of the rod transversely of the body but to restrain the rod against swinging movement longitudinally of the body; and means carried by the steering member for engaging the elongation of the spring positively whereby the spring will constitute a returning means for the rod.

4. A shock absorber comprising upper and lower members; a rod slidable longitudinally in one of said members and tiltable in a single plane in said member; means for pivotally connecting the rod with the other of said members, for swinging movement in said plane; and a helical spring interposed between the said members and surrounding the rod, the spring terminating in an extended arm prolonged for positive engagement with a steering rod.

5. A shock absorber comprising an upper plate; rods pivoted to the upper plate for swinging movement in a single plane; a lower plate receiving the rods slidably and for swinging movement in said plane; an arched guide carried by the lower plate; helical springs surrounding the rods and having their upper ends secured to the upper plate, the lower ends of the helical springs bearing on the lower plate and terminating in arms extended through the guide and prolonged beyond the lower plate, the arms being adapted to engage a projection on a steering rod for governing the movement of the steering rod.

6. A shock absorber comprising an upper plate provided in its under side with a recess; a lower plate having an opening therethrough; a rod slidable longitudinally in the opening and having its upper end disposed in the recess in terminal abutment with the upper plate, the recess and the opening being transversely elongated in a common direction along one diameter of the opening and the recess, and being contracted along a diameter disposed at right angles to the first specified diameter, to retain the rod for swinging movement in a single plane; means for pivotally connecting the upper end of the rod with the upper plate; a compression spring interposed between the plates and surrounding the rod; means for securing the upper plate to a vehicle body; and means for securing the lower plate to a vehicle axle.

7. The combination with the spring of a vehicle and an axle having upper and lower horizontal flanges, of an upper plate disposed below and abutting against the spring, the upper plate having a rearwardly projecting arm provided with a recess in its under side; means for securing the upper plate to the spring; a lower plate having a vertical flange fitting between the horizontal flanges of the axle, and provided with an opening; means for securing the lower plate to the axle; a rod slidable in the opening and having its upper end mounted to rock in the recess of the upper plate; means for securing the upper end of the rod pivotally to the upper plate; and a compression spring interposed between the plate.

In testimony that I claim the foregoing as my own, I have hereto affixed my signature in the presence of two witnesses.

JESUS M. LÓPEZ.

Witnesses:
 IVY E. SIMPSON,
 AGNES ROCKELLE.

Copies of this patent may be obtained for five cents each, by addressing the "Commissioner of Patents, Washington, D. C."